Oct. 4, 1949.  H. T. LEO ET AL  2,483,548
METHOD OF PRODUCING PECTOUS JELLIES
Filed March 20, 1944  3 Sheets-Sheet 1

Inventors
Herbert T. Leo
Clarence C. Taylor

Oct. 4, 1949.                H. T. LEO ET AL                2,483,548
                     METHOD OF PRODUCING PECTOUS JELLIES
Filed March 20, 1944                              3 Sheets-Sheet 2
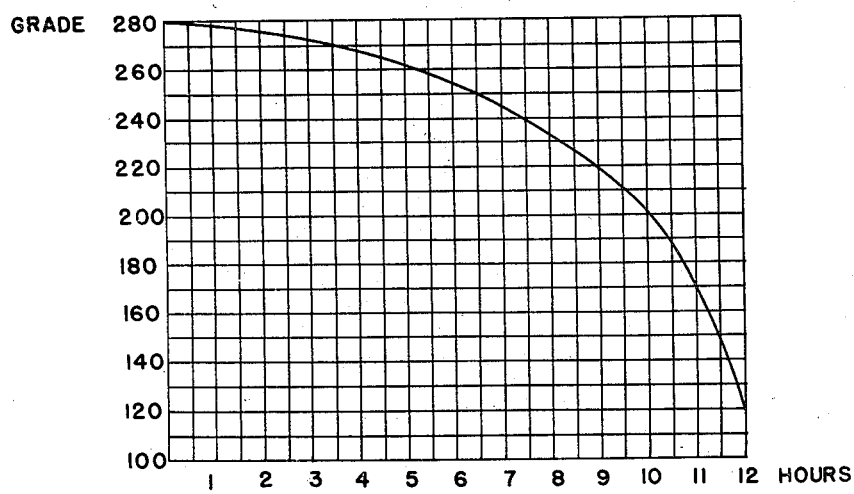
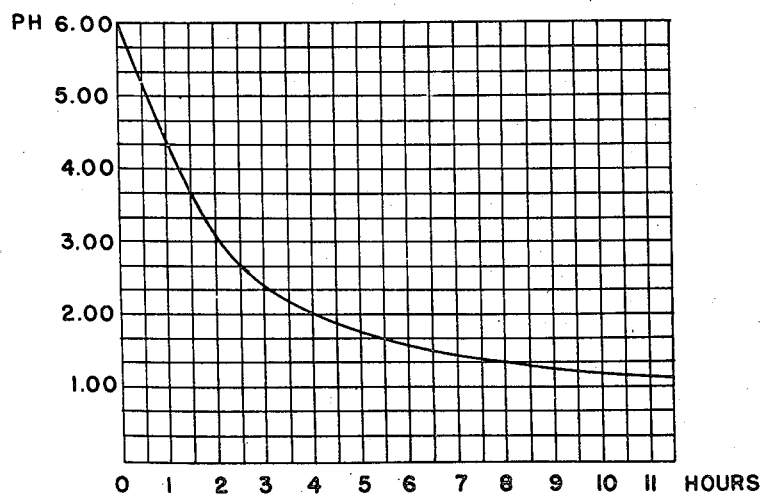

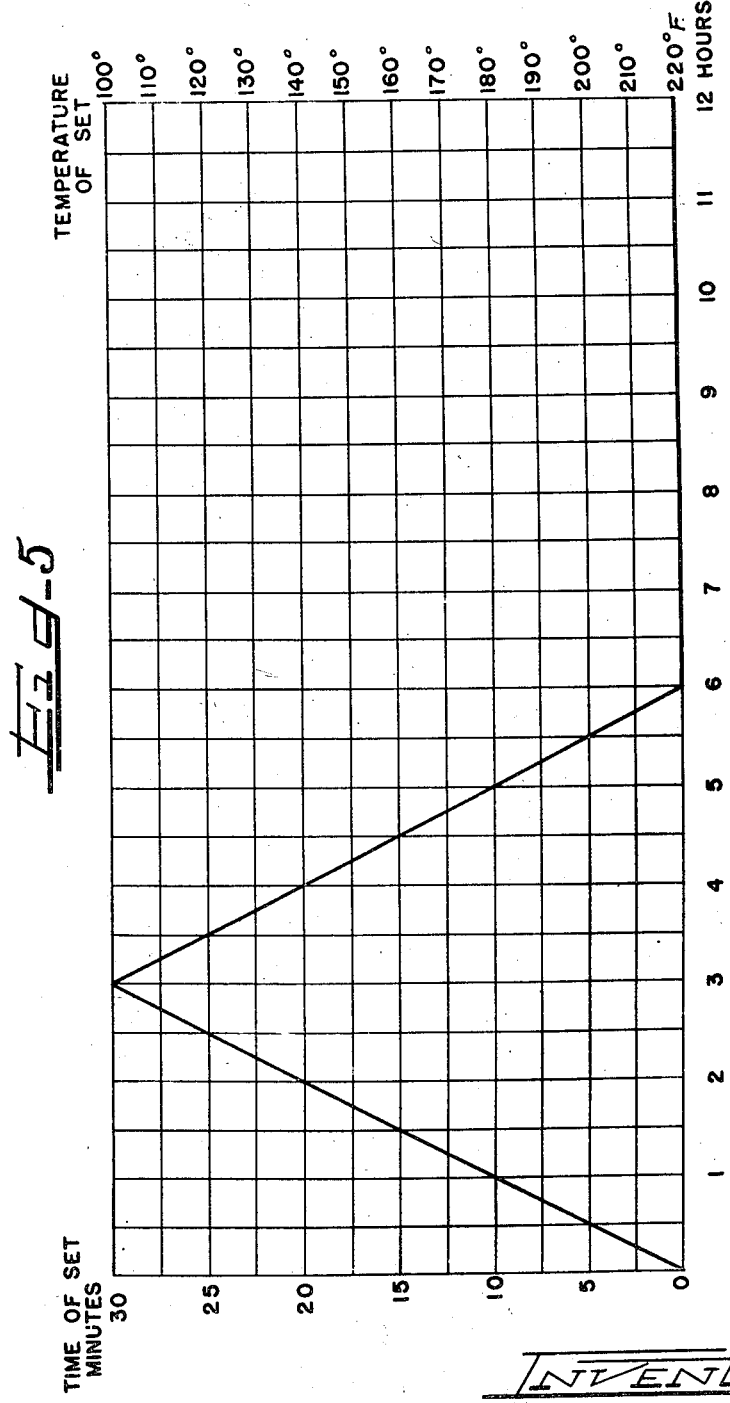

Patented Oct. 4, 1949

2,483,548

UNITED STATES PATENT OFFICE 2,483,548

METHOD OF PRODUCING PECTOUS JELLIES

Herbert T. Leo and Clarence C. Taylor,
Anaheim, Calif.

Application March 20, 1944, Serial No. 527,234

7 Claims. (Cl. 195—30)

This invention relates to compositions containing chemically modified pectin, to methods of preparing pectous jellies from such compositions, and to jellies prepared by such methods. More particularly, the invention pertains to pectin modified by enzymatic action and to jellies prepared from thus modified pectin.

Pectous substances can be isolated from many vegetable materials, for instance, carrots, sugar beets, flax, plums, berries such as strawberries, tomatoes and the like. The usual raw materials for commercial production of pectin include apple pomace and the albedo or rind of citrus fruits, in particular, rinds of lemons, limes and oranges. In apples, as well as in citrus fruit material, pectin is present in the form of a water insoluble composition commonly referred to as protopectin. For the purpose of isolating water soluble pectin from vegetable material, in particular, from the above indicated fruit material, such fruit material is conventionally subjected to an initial extraction by means of an acid aqueous medium followed by a separation of the resulting extract from the residual fruit pulp. This extraction with an acid aqueous medium is usually carried out at an elevated temperature and apparently effects a more or less complete hydrolysis of the protopectin with the formation of water soluble pectin that is dissolved by the acid aqueous extracting medium. The separated pectous extract usually contains upward from 0.5% pectin which is subsequently isolated according to one of several available methods.

For instance, pectin has heretofore been isolated from a pectous extract by the addition to the extract of an alcohol, such as ethyl alcohol or isopropyl alcohol, whereby alcohol-water mixtures are formed in which pectin is insoluble. Such precipitation by means of alcohol, however, is not favored by those skilled in the art as much as another precipitation method involving the precipitation of aluminum hydroxide in the pectous extract. The precipitated aluminum hydroxide takes large amounts of pectin out of solution. The coprecipitate of aluminum hydroxide and pectin may be separated from the mother liquor in which it is formed and washed with acidified aqueous alcohol for the purpose of selectively removing the aluminum hydroxide. The pectin, being insoluble in aqueous alcohol, retains its solid form throughout the washing procedure and may subsequently be dried and ground, the dried and ground washed pectin representing the finished product. A preferred method for isolating pectin from an extract by means of precipitation of aluminum hydroxide in said extract is disclosed in our copending application, Serial No. 509,794, filed November 10, 1943, and entitled "Method of preparing pectin," now abandoned.

In view of the fundamental differences between the pectous products designated by the prior art workers as "pectinic acid" and produced on one hand, by acid treatment, and on the other hand, by pectase treatment, the present applicants, in this application, will hereinbelow restrict the term "pectinic acid" to include only the gel forming pectous bodies obtained by acid treatment. The new term "pectinylic acid" will be used hereinbelow to indicate pectous bodies obtained by treatment of pectin with pectase. The term "pectinylic acid" is further restricted to exclude pectous bodies exposed to pH values above 5 effected by alkalis for a period long enough to modify the properties of such pectous bodies.

The present invention relates particularly to jelly forming compositions containing pectinylic acids, to jellies formed from pectinylic acids and to methods for preparing such jellies.

An important object of this invention is to provide jelly forming compositions, jellies and methods for preparing jellies involving pectinylic acids.

A specific object of this invention is to provide pectinylic acid jellies and methods for preparing such jellies in which sugar is an essential ingredient.

Other and further objects and features of this invention will become apparent from the following description and appended claims.

Figure 3 shows the effect of the progressive treatment of pectin with pectase on the grade of the resulting pectinylic acids.

Figure 4 shows the progressive lowering of the pH value at which the calcium jelly of the pectinylic acids can be dissolved as pectase action progresses.

Figure 5 shows the "time of set" and "temperature of set" of the pectinylic acids prepared by the reaction of pectase on pectin over indicated periods of time.

Figure 1:
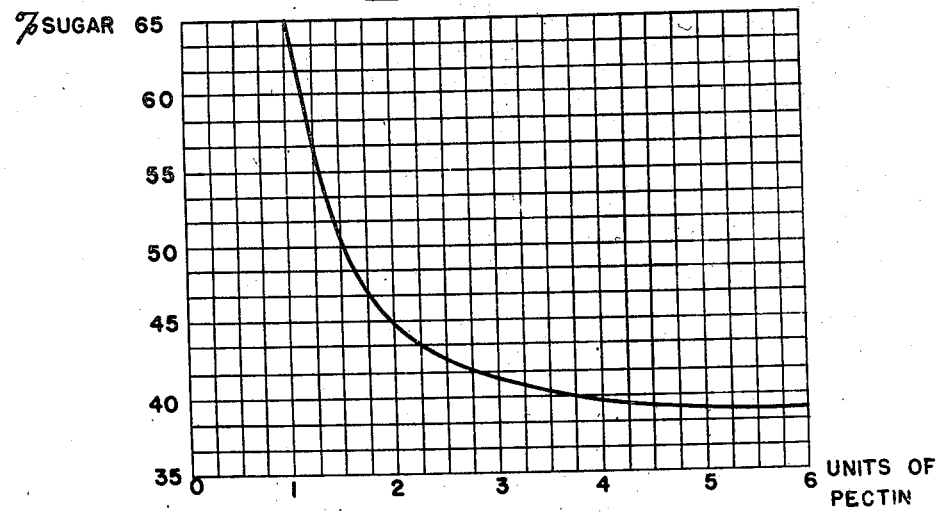
Figure 1 shows the relation of sugar concentration to units of 65 grade pectin in gels having the same texture.
Figure 2:
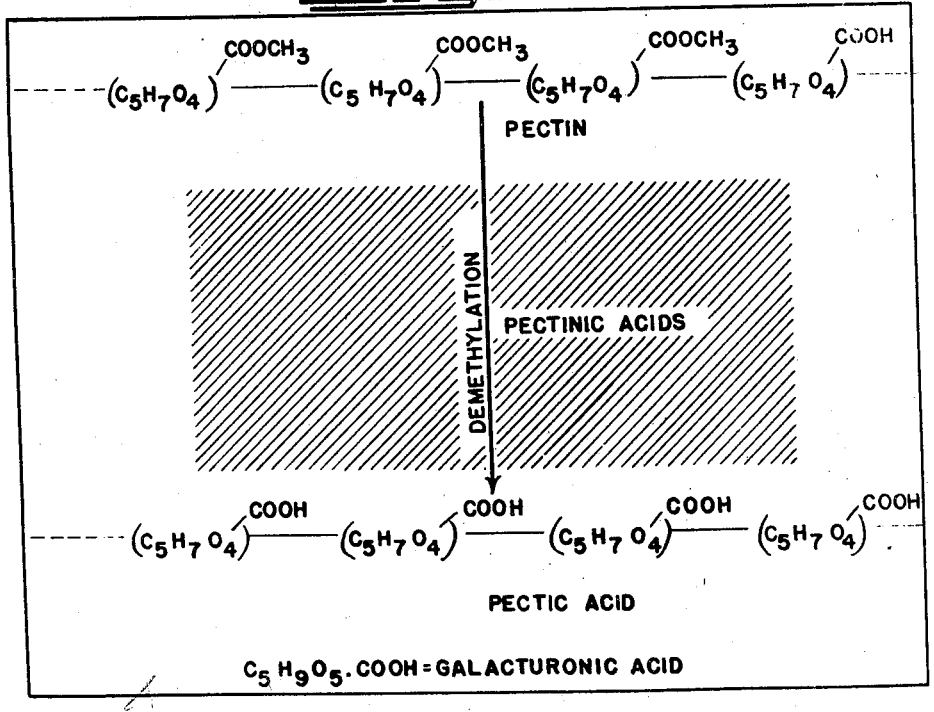
Figure 2 shows the relation between pectin, pectinic acids, and pectic acid.

It has long been known that the commonly occurring enzyme, generally termed pectase, can split off methyl alcohol from pectin in solution. If, moreover, calcium salts are present in sufficient amounts (as in fruit juices), a jelly is formed which has usually been thought to consist of the calcium salts of the "pectic acid" resulting from this supposed demethoxylation.

This combined effect of pectase and of calcium is partly responsible for the familiar phenomenon of the natural gelling of certain fruit juices when pressed and drained out from the fruit. This phenomenon is especially noticeable in blackcurrents and raspberries, and it has been observed in the case of gooseberries when these are crushed and allowed to stand for some hours before the juice is pressed out. The same cause also appears to be responsible for the occasional formation of a jelly in sulfited fruit pulp. In such cases, as with the fresh juices, it seems probably that a separate enzymic action first liberates the pectin in a soluble form from the cell wall substance, and the pectin is then attacked by the pectase. The sulfurous acid does not suppress the activity of these enzymes. Possibly the reason why no gelling occurs in undamaged fruit is because the pectin precursor (protopectin) in the cell wall is segregated in some way from the enzymes before the fruit tissue is ruptured.

We have found that in the preparation of pectinylic acids, provision must be made for maintaining a suitable pH value by agents other than alkalis. Further, provision must be made for a sharp termination of the pectase action, and such sharp termination should be effected at definite stages in the pectase action according to the nature of the product desired. Finally, provision must be made for removing all but definite small amounts of calcium and/or other polyvalent metal compounds admixed or combined with the pectinylic acids. All these precautions are important due to the fact that the gelling properties of pectinylic acids are controlled by these steps. We will describe in this application both our novel method of preparing pectinylic acids and the various products thus obtained as well as the methods to be used for preparing jellies from the various pectinylic acids that can be prepared according to our novel enzymatic method. Such disclosures are required to show the significance of the use, for jelly making purposes, of pectinylic acids prepared by methods including various steps disclosed in this application.

By the term "pectase" we mean an enzymic material derived from a suitable biological or vegetable source and capable of acting on soluble pectin to convert the pectin partially or completely into the products designated as pectinylic acids. Whether or not pectase includes only a single enzyme or a group of enzymes is not definitely known. For this reason, the term "pectase" is used in this application to cover both any single enzyme and any mixture of enzymes capable of acting on soluble pectin with the above mentioned results.

We have found that rapidly growing vegetable material provides a rich source of pectase. Specific examples are the sprouts of the tobacco plant and the growing plants of the legume family, particularly clover and alfalfa. However, when infusions of growing leguminous plants are prepared, as by grinding or otherwise breaking up growing leguminous plants, maceration of the crushed material with water and separation of the resulting infusion of extract from residual solid material, the resulting infusion or extract contains in suspension relatively large amounts of finely divided solid particles containing a green coloring matter believed to be chlorophyll. This finely divided residual matter cannot easily be separated from the infusion or extract and, when the infusion or extract is used to modify soluble pectin, tends to color this pectin as well as the products derived from the pectin by the action of the pectase, to confer on the treated material and the products of reaction an objectionable green color.

We therefore prefer to use pectase free from objectionable coloring bodies.

The pectous material treated with such a pectase solution is preferably a filtered pectin extract obtained from suitable citrus or other fruit material by extraction with an acid aqueous medium as described, for instance, in our application Serial No. 509,794. Such extract usually contains from one-half to one percent of pectin, and most often about 0.75% pectin. Although such thin or dilute pectin extracts or liquors may be treated according to the methods of our invention with good results, we prefer to treat concentrated pectin solutions such as a pectin extract concentrated from 2 to 1 or as much as 4 to 1. The concentrated extract discussed hereinbelow by way of example contains about three times as much pectin as the original extract prior to concentration. The concentrated pectin extract is quite fluid.

We have discovered that pectase is best allowed to act on such concentrated pectin solutions at a pH of from 5.5 to 6.5. We have further found that as the pectase action progresses, acid is liberated in the reacting mass and that the enzyme action is correspondingly decelerated. To maintain a suitable pH value throughout the enzme action, for instance, about 6.00, we add a sufficient amount of chalk to the pectin concentrate. In the case of a pectin solution having a concentration such that one gallon of pectin concentrate is capable of gelling 37½ pounds of sugar at 65% sugar concentration, we have found that from eleven to eighteen grams of chalk per gallon of concentrate will be sufficient. As a rule fifteen grams of chalk suffice to maintain a pH value of about 6.0. This pH value is maintained even though the pectase action may be continued for as long as twelve hours.

To one gallon of pectin concentrate which originally had a pH of about 3.00 and contained no added acid, we thus add fifteen grams of chalk suspended in a small amount of water to effect a pH value of about 6.00.

To one gallon pectin concentrate containing added chalk there may be added one pint of the above described alfalfa extract, and the resulting mixture is stirred well to effect complete intermixing.

As the enzyme action progresses in the originally fluid pectin solution, a light jelly forms within fifteen or thirty minutes, and this jelly becomes progressively firmer until the jelly can withstand considerable pressure. At four hours the jelly may be as firm as brick cheese. However, it is not possible to judge the progress of the reaction by the appearance and change of texture in the jelly, although, if the process is caused to take place in jelly glasses, increasing firmness can definitely be noted by turning out one glass each hour and testing the jelly for firmness. All of such jellies are in fact "low sugar" or practically "no sugar" jellies.

We have found that one pint of an alfalfa infusion will convert a gallon of pectin extract concentrated to a ratio of 3 to 1 as rapidly as the same pint would convert the original more dilute extract, if the pH value is maintained at about 6.00. This rapid rate of conversion is maintained even though three times as much acid may be released by the enzyme in the case of the concentrated extract. This liberated acid is neutralized by the calcium carbonate added to the pectin extract prior to the initiation of the enzyme action.

We find that there is an optimum temperature of enzyme action at about 110° F. The enzyme is not killed below 155° F. Since calcium carbonate, particularly in the form of precipitated chalk, does not adversely effect the pectin at a temperature of 150° F., the enzyme action may be conducted through a wide range of temperatures.

For terminating the pectase reaction, any fluid may be removed from the jelly formed by the action of the pectase, and the jelly is then disintegrated or comminuted by grinding or, preferably, by forcing the jelly through a coarse screen or similarly apertured means. Such disintegration or comminution of the jelly facilitates penetration of the jelly by the high strength alcohol into which the jelly is introduced for the purpose of terminating the pectase action. The strength and amount of the alcohol into which the disintegrated jelly is dropped should be such that the alcohol concentration of the resulting mixture is preferably between 40 and 50%. At such alcohol concentration, the jelly particles are dehydrated to a considerable extent. Acid is incorporated with the alcohol, preferably after the disintegrated jelly has been dropped into the alcohol, in an amount such as to effect a pH value in the resulting mixture of 1.00 or less. Preferably, the pH value is reduced to at least 0.75. The purpose of the acidification is to remove from the jelly all but the small amount of calcium specified hereinbelow. For this reason, acids are used that form soluble calcium salts, in particular, hydrochloric acid. Any alcohol may be used in which calcium chloride or other calcium salts formed during the washing is soluble. When the alcohol concentration is between 40 and 50%, we find that the jelly is easily penetrated by the acidified alcohol to effect the desired removal of calcium compounds.

This washing with acidified alcohol is followed by washing with unacidified alcohol and is carried out so thoroughly that one gram of the resulting washed and dried pectin will be soluble in 100 cc. distilled water at a temperature of 130° F. This solubility corresponds to a maximum ash content of 2.8%. The significance of this thorough washing will be apparent from the explanations made hereinbelow. Ordinarily one acid alcohol wash at a pH of from 0.60 to 1.00 is sufficient to reduce the ash content to 2.8%, when coupled with subsequent rinses with alcohol carried out until the pH value of the rinsed pectous matter is about 3.00. Such washing with unacidified alcohol is carried out to remove from the acid alcohol washed pectin, calcium chloride and acid reacting matter left therein after the acid alcohol wash.

After the alcohol washing, the pectous solids are pressed, dried in vacuo and preferably ground to 100 mesh size.

We have found that washing the pectous jelly obtained by pectase treatment to reduce its ash content to below 2.8% will permit ready solution of the washed modified pectin, even when treated for as long as twelve hours in the manner disclosed hereinabove, to form a 1% solution in distilled water at 130° F. without the use of any calcium precipitating agents. This solution will have a natural pH value ranging from 2.90 to 3.20.

The time at which pectase action is to be terminated depends upon the nature of the product desired. For this reason it is necessary to disclose the nature of the changes in the pectin effected by the progressive action of pectase under the above described conditions and the significance of these changes in relation to the utilization of the resulting modified pectins for various purposes.

Reference is made to Figure 4 showing the progressive lowering of the pH value at which the calcium jelly can be dissolved as pectase action progresses. These data were obtained in treating a pectin extract concentrated at a ratio of 3 to 1, 15 grams calcium carbonate and 1 pint alfalfa extract having been added to this pectase concentrate, as described hereinabove. The pH value of the concentrate is maintained throughout the pectase action at a value ranging from 5.50 to 6.20 by the added chalk. The pectin concentrate was made from lemon peels cooked with hydrochloric acid at a pH value of from 2.40 to 2.60 and then neutralized with calcium carbonate to a pH value of 3.00 and filtered. This extract was concentrated in vacuo from three gallons to one gallon. The alfalfa extract was made by macerating two pounds green alfalfa and one gallon of water, pressing and filtering the extract. During the pectase action the temperature of the concentrate was maintained at approximately 100° F.

In determining the progress of the pectase reaction, we take small samples of the calcium jelly formed as a result of the pectase action and break up this jelly, adding a small amount of distilled water thereto. To the resulting suspension in distilled water of the calcium-pectin jelly we add gradually increasing amounts of acid until solution of the jelly particles becomes evident. For acidifying the aqueous suspension of calcium-pectin jelly, we have used an acid solution made up of 50 cc. 80% U. S. P. lactic acid, 50 cc. 37% chemically pure hydrochloric acid and 400 cc. of distilled water. This combination of acids has been found convenient because both the acids form water soluble salts and further, the pH values may more easily be controlled by such a combination of a relatively weak and a relatively strong acid.

Disintegration of the calcium-pectin jelly may be effected by grinding the jelly with distilled water in a glass mortar and adding the hydrochloric acid-lactic acid mixture until solution takes place. Care must be taken not to lower the pH value too rapidly, in order to give the larger lumps of jelly time to dissolve. The appearance of the liquid will indicate when solution is taking place.

In the earlier stages of the treatment solution takes place quite rapidly. As pectase action progresses toward the eight hour period, solution takes place more slowly and finally, at about 12 hours, a point is reached at which the pectin jelly does not go into complete solution at a pH value of 1.00 or less. We surmise that at this point the calcium content of the pectin jelly may be dissolved but that the pectin itself has been so far modified that it no longer is soluble in acid media.

Figure 4 shows the correlation between time of treatment and the pH value required to re-dissolve the calcium-pectin jelly formed during the pectase action. It is confined to the specific conditions of pH value, pectin concentration and pectase concentration and temperature indicated hereinabove. The reaction may be speeded up or decelerated by using other pH values, pectin concentrations, pectase concentrations and temperatures. In general, lower pH values, lower temperatures and smaller concentrations of pectase will decelerate the reaction.

As shown by Figure 4, the progressive action of pectase on pectin with the formation of pectinylic acid renders the pectinylic acid more and more susceptible to precipitation by calcium compounds. Or, the pectinylic acid combines with or absorbs calcium more strongly, so that lower and lower pH values are required to dissolve the precipitate formed by the action on pectinylic acid of soluble calcium compounds.

Accompanying this increase in calcium susceptibility is an increase in viscosity of the aqueous solutions of pectinylic acid prepared in distilled water. Pectinylic acid obtained by the treatment described hereinabove and continued for from 8 to 12 hours yields a product that after solution with distilled water at 130° F. sets on cooling to form a gelatinous product. When pectinylic acid is prepared as described hereinabove and washed to a maximum ash content of 2.80%, the viscosity of the pectin solutions in distilled water reaches a maximum at a pH value very close to 3.00. It should be mentioned in this connection that pectinylic acid prepared and isolated as described hereinabove has a natural pH value, when dissolved in distilled water, ranging from 2.90 to about 3.20. Pectinylic acids prepared as described hereinabove by the action of pectase on pectin for periods of time as long as 18 hours or longer, when washed with alcohol acidified with hydrochloric acid and rinsed with alcohol to lower the ash content to about 2.8%, are all perfectly soluble in distilled water, and require no calcium precipitating agents, such as sodium citrate, tartrate, phosphate or oxalate, for solution.

Figure 3 illustrates the effect of the progressive treatment with pectase on the grade of the resulting pectinylic acids. As shown on this graph, after pectin of known grade (280 grade) is dissolved in distilled water to form jellies containing 65% sugar at a pH value of 2.50, the jelly grade is lowered slightly during the first few hours, being lowered more rapidly during the last hours of treatment until after about twelve hours the grade has decreased by about 50% or more.

Figure 5 shows the "time of set" of pectinylic acids prepared by treatment with pectase for periods of time as long as twelve hours. In determining the "time of set," jellies were prepared from pectinylic acid using a small amount of sodium citrate at a 65% sugar content and a pH value of 2.50. The water used contained 80 parts per million of calcium. The "time of set" is defined as the time required for the pectin composition to set to jelly in 8 ounce glasses as measured in minutes. The corresponding temperatures of set at this pH value are also shown graphically. As shown by this graph, the temperature of set is lowered, during the first three hours of treatment, from 220° F. to 100° F. During the next three hours, the temperature of set is again raised to 220° F. and remains at this point for the last six hours of treatment. In other words, the jellies will pre-set in the kettle at six hours or longer treatment.

In the setting of the pectinylic acid obtained by treatment ranging up to three hours, the presence of a trace of calcium has little or no effect on the temperature of set. In the setting of the pectin jellies obtained as the result of treatment ranging from three to six hours, the setting seems to be effected both by the sugar and pH values and by the calcium present. After six hour treatment, the formation of jellies seems to be due exclusively to the formation of calcium precipitates. This theory has been verified by the preparation of the corresponding jellies in the absence of any calcium, when the curve is obtained similar to that shown in Figure 3, and in which there is a progressive lowering in temperature of set without any final rise. It should be noted, however, that pectins having a temperature of set at room temperature at a pH value of 2.30 form the approximate limit of usefulness for the purpose of preparing jellies containing 65% sugar without depending on the formation of calcium precipitate.

We tabulate hereinbelow the minimum pH values required for dissolution of the calcium jelly formed in the above described specific example of treatment of pectin with pectase to form pectinylic acid:

| Time of Treatment | pH Required For Dissolution of Jelly |
|---|---|
| 0 | 6.0 |
| 1 | 4.4 |
| 2 | 3.1 |
| 3 | 2.4 |
| 4 | 2.1 |
| 5 | 1.9 |
| 6 | 1.6 |
| 7 | 1.5 |
| 8 | 1.4 |
| 9 | 1.3 |
| 10 | 1.2 |
| 11 | 1.1 |
| 12 | 1.0 |

With respect to the pectin treated for 12 hours, it should be noted that complete dissolution of the jelly is not effected at a pH of 1.0. The "pH required for dissolution of jelly" mentioned in this application should be interpreted accordingly.

It should be understood that there is an equivalency between any treatment with pectase in a medium having a suitable pH value induced by the presence of calcium, magnesium compounds or the like, and not due to alkali compounds, which will effect the formation of a calcium jelly requiring a minimum pH for dissolution of the jelly equal to any one of the numbers on the right-hand column of the above table and a treatment effected under the above illustrated specific conditions for a time specified in the above table as required to effect the pH value in question.

It should further be understood that, if desired, the pectase action may be terminated, for instance, by heating to above 160° for a time sufficient to kill the enzyme, followed, at any desired interval of time, by the above described washing with acidic alcohol for the purpose of reducing the ash content of the pectinylic acid at least to 2.80%.

In the subsequent part of the present application, the extent of pectase treatment of any given pectinylic acid will be referred to in terms of pH value required for dissolution of sugar free calcium jellies.

We have found that in the case of pectinylic acids requiring a pH value of 2.40 for the dissolution of their calcium jellies, such pectinylic acids should not be exposed to elevated temperatures for any prolonged period of time at pH values of 4.50 or higher due to alkali compounds. In the case of pectinylic acids requiring a pH value of about 1.6 for the dissolution of their calcium jellies, such pectinylic acids should not be exposed for any prolonged period of time at elevated temperatures to a pH value of 5.30 or higher due to alkali compounds. In the case of pectinylic acids requiring a pH value of 1.0 for dissolution of their calcium jellies, such pectinylic acids should not be exposed for any prolonged period of time at elevated temperatures to pH values of about 6.00 up to 7.00 due to alkali compounds. Exposure of these pectinylic acids to pH conditions above the specified values at elevated temperatures for a prolonged period of time will destroy part or all of the jelling properties of the pectinylic acids.

In making jellies from pectinylic acids, care must be taken not to exceed the above specified maximum permissible pH values in the kettle.

Jellies may be prepared in conventional manner with acid sugar solutions without depending on the formation of a calcium precipitate from pectinylic acids treated up to the point where the pH of set has been reduced to 2.30 at room temperature.

In the preparation of jellies from pectinylic acids by the dehydrating effect of sugar at a suitable acid pH value, the calcium content of the water used for preparing the sugar jelly is kept at less than ten parts per million in the case of pectinylic acids requiring a pH value of 2.40 or less for the solution of their calcium jellies. The reason for this precaution is that in the case of pectinylic acids requiring a pH of 2.40 for solution of their calcium jellies, mere traces of calcium cause an increased viscosity and a semblance of premature set in the kettle. As shown by the data relating to 65% sugar jellies graphically illustrated in Figure 5, pectinylic acids requiring a pH of less than 2.4 for solution of their calcium jellies have their temperature of set raised by the presence of a trace of calcium. In the case of pectinylic acids requiring a pH of 1.6 or less for the solution of the calcium jelly, jelling in the kettle will take place in the presence of a trace of calcium (10 parts per million or more) under pH conditions otherwise conducive for formation of a high sugar jelly. By the term "high sugar jelly" we refer to a jelly containing 40 or more percent sugar by weight. All pectinylic acids requiring a pH of 1.6 or less for solution of the calcium jelly will ordinarily jell instantly in the kettle at a pH of 2.50 in the presence of a trace of calcium (10 parts per million or more) even in the presence of 20% by weight of the pectin of sodium citrate. Even if jellying does not take place in the kettle when 65% sugar jellies are prepared from pectinylic acids with tap water the viscosity becomes so great that the resulting heavy syrup tends to be burned in the kettle, in spite of the presence of 20% sodium citrate.

High sugar jellies containing up to 65% sugar may be prepared in the presence of a trace of calcium according to conventional methods utilizing the dehydrating effect of sugar at suitable acid pH values from pectinylic acids requiring a minimum pH value of not less than 2.4 for solution of their calcium jellies.

The preparation of jellies containing more than 65% sugar by weight (hereinafter referred to as "candy jellies") requires special precautions even when a pectinylic acid is used that requires a pH value of higher than 2.40 for solution of its calcium jelly. When jellies of higher sugar content are made, the temperature of set (and the pH of set) of the pectin are elevated. For instance, a pectin having a pH of set of 3.00 at a temperature of 218° F. and 65% sugar content will have this pH of set raised to 3.65 when twice the amount of pectin is used and the total sugar content in the finished jelly is 75%. Further, when the sugar content in this finished jelly is above 65%, the susceptibility of the pectinylic acid to calcium precipitation is increased. At such high sugar concentration traces of calcium (such as are present in the less than 2.8% ash content of the pectinylic acid) will cause the mass in the kettle to become so thick as to form an insulating layer upon the kettle which is burned or caramelized. This tendency of the jelly batch to thicken can be reduced almost completely by the addition of sodium citrate, tartrate or like edible alkali salts capable of precipitating the calcium present, and thus able to keep the pectin from forming a precipitate with the calcium. However, the addition of sufficient amounts of such sodium salts to prevent precipitation of calcium jellies may raise the pH values above 4.50, at which pH value the pectinylic acid is adversely effected by the high temperatures prevailing in the kettle. For this reason it is necessary to add an acid such as citric or tartaric acid to keep the pH at or below 4.50 when a salt capable of precipitating the calcium is used to prevent the formation of calcium jellies.

An example is given hereinbelow of the preparation of a jelly containing 75% sugar with pectinylic acid requiring a pH value of 2.4 for solution of its calcium jelly. 500 grams of a 50 grade pectin are prepared by mixing together 100 grams 250 grade pectinylic acid requiring a pH of 2.4 for solution of the calcium jelly, 50 grams sodium citrate, 20 grams citric acid and 330 grams dextrose. When 15 grams of the resulting 50 grade pectin and 9 grams dextrose are dissolved in 100 cc. of distilled water, the resulting solution will have a pH value of 4.50. By the addition of the sodium citrate and citric acid, the tendency toward the precipitation of calcium jelly has been suppressed, so that no insulating layer will form in the kettle when a jelly containing 75% sugar is prepared. The pH value is low enough so that the pectinylic acid will not be adversely effected by the high temperature in the kettle. Yet the pH value is too high for the preparation of a satisfactory jelly without depending on the formation of a calcium precipitate.

For the preparation of a jelly containing 75% sugar from the above disclosed 50 grade pectinylic acid, the following ingredients are used:

| | | |
|---|---|---|
| 50 grade pectinylic acid | pounds | 1 |
| Distilled water | quarts | 6 |
| Granulated sugar | pounds | 10 |
| Glucose (83 to 85% solid) | do | 6 |

Since sucrose crystallizes at 65%, we use, when it is desired to reach a total sugar content above 65%, a sufficient amount of glucose to reach the desired total sugar content. Glucose is a combination of dextrin, maltose and dextrose. Glucose may be made that contains as much as 85% solids without crystallization of any of the ingredient.

The pectin is put in the kettle with the water and part of the sugar, which aids in dispersing the pectin. This mixture is brought to a boil and the balance of the sugar is added. Boiling is continued to a temperature of 220° F. (at sea level) and the hot melted glucose is stirred in. The mixture is again brought to a boil and color, flavor and setting acid are added. The setting acid is made up in the form of a syrup from the following ingredients:

| | Pounds |
|---|---|
| Citric acid | 2 |
| Sugar | 4 |
| Water to make one gallon of solution | |

6½ fluid ounces of this acid syrup are added to the hot syrup of the previously cooked batch. This addition will not cause the jelly to set until it has reached its temperature of set, about 155° F. at a pH of 3.65.

The above disclosed formula for the preparation of a jelly containing 75% sugar is workable only in the case of pectinylic acid requiring a pH no lower than 2.4 for the solution of its calcium jelly. The formula must be revised somewhat for the preparation of candy jellies containing 75% sugar from pectinylic acid requiring for the solution of calcium jelly pH values of, for instance 3.1 or 2.1. It is pointed out, however, that in the case of the preparation of jellies containing more than 65% sugar from pectinylic acids, without depending on the formation of a calcium precipitate, the water used should be distilled, or at least, have its calcium content reduced to less than ten parts per million. Otherwise the product is not satisfactorily handled in the kettle or will gel too soon after mixing with the setting acid. Preferably, distilled water is used. "Permutite" systems of water softening will lower the calcium content to the same point, but sometimes such systems are overloaded or run too far for safety.

An alternate formula for the preparation of a "candy jelly" utilizes a pectinylic acid of 250 grade requiring a pH value of 2.4 for the solution of its calcium jelly. The following ingredients are used to reduce this pectinylic acid to 100 grade:

| | Grams |
|---|---|
| 250 grade pectinylic acid (ash less than 2.8%) | 300 |
| Sodium citrate | 150 |
| Citric acid | 60 |
| Dextrose or cerelose | 250 |
| 100 grade pectinylic acid | 750 |

7½ grams of this 100 grade pectinylic acid, when dissolved in 100 c. c. distilled water along with 18 grams cerelose effect a pH value of 4.50.

The following ingredients are used in preparing the finished "candy jelly":

| | | |
|---|---|---|
| 100 grade pectinylic acid | grams | 42½ |
| Sugar | ounces | 28 |
| Distilled water | quart | 1 |
| 83–85% glucose | pound | 1 |
| Citric acid syrup (prepared as disclosed hereinabove) | cc. | 35 |
| Color and flavor to suit. | | |

The pectin is mixed with part of the sugar (for facilitating the dispersion of the pectin), and stirred into the water, which is then brought to a rolling boil. The rest of the sugar is then added, and the resulting mixture is brought to a boil at 220° F. The hot glucose is then stirred in, and the mass is again brought to a boil. The kettle is then removed from the fire, color and flavor are stirred in, and the acid syrup is finally stirred in. The jelly will form slowly on cooling, so that there will be ample time to pour the batch from the kettle into shallow pans or molds to cool. The final pH value of the candy jelly will be close to 3.65 and the total sugar solids 75%. If more than 10 parts per million of calcium would have been present in the water, this jelly would have set in the kettle, in spite of the presence of sodium citrate.

In brief, pentinylic acids can be made to form acid high sugar jellies of the conventional type by methods similar to the methods used for preparing conventional high sugar pectin jellies if care is taken to prevent thickening or gelling in the kettle due to the formation of calcium precipitates. In the case of a pectinylic acid requiring only a pH value higher than 2.40 for solution of its calcium jelly, a jelly containing not more than 65% sugar can be prepared in the presence of more than 10 parts per million of calcium in the water used.

Thus, pectinylic acids can be made to form acid high sugar jellies of the conventional type by methods including the steps of cooking the jelly batch at a relatively high pH value and depressing the pH value by the addition of acid at or after pouring the jelly batch. The setting of such pectinylic acid jellies is due to the dehydrating effect of the sugar at the prevailing pH conditions, and does not involve any formation of a calcium precipitate.

No special precautions need be taken to prevent the formation of calcium precipitates from pectinylic acids requiring only a pH value higher than 2.40 for solution of their calcium jellies, if the finished high sugar jelly does not contain more than 65% sugar. If candy jellies are to be prepared from such pectinylic acids, water containing less than 10 parts per million of calcium is used, and a soluble alkali salt capable of precipitating calcium is added to prevent formation of calcium jellies, while a weak acid is added to maintain a suitable pH value after the addition of the alkali salt.

Our method for controlling the available calcium in the kettle involves the use of water containing not more than ten parts per million of calcium. Calcium is introduced into the jelly batch in the form of a calcium salt insoluble at relatively high pH values but gradually dissolved at lower pH values. Examples of such salts are the phosphate, carbonate and citrate of calcium. Tricalcium phosphate, for instance, is insoluble at relative high pH values, being converted at relatively low pH values into $CaH_2(PO_4)_2$ which is soluble and provides sufficient calcium to effect the formation of a precipitate in the presence of pectinylic acid. At a pH of 5.80 or higher tricalcium phosphate is so insoluble that even in the case of the most calcium susceptible pectinylic acids no precipitate will form, because calcium ions are not present in sufficient numbers to reach the insolubility point of calcium pectinylate. Pectinylic acid requiring values for solution of calcium jelly down to 1.6 are not so susceptible to calcium, and therefore a pH value as low as 4.20 can be maintained in the presence of an excess of tricalcium phosphate without formation of sufficient calcium ions to precipitate the calcium and pectinylic acid from solution. A sufficient amount of acid is introduced into the jelly batch just before or at the moment of pouring to lower the pH value to a point where calcium ions are liberated in sufficient numbers to cause setting within a suitable period of time. The acid may be introduced into the containers into which the jelly batch is poured.

We have indicated hereinabove that pectinylic acids have their gelling properties destroyed at a pH value due to alkali compounds and exceeding specified values depending upon the extent of pectase action. Care must always be taken not to exceed these maximum permissible pH values. In the presence of an excess of tricalcium phosphate, care must be taken not to exceed the minimum pH values specified in the preceding paragraph, if gelling in the kettle is to be avoided. When tricalcium phosphate has been introduced into a jelly batch, we therefore maintain in the kettle, in the case of pectinylic acids requiring pH values ranging from 6.0 to 1.6 for solution of their calcium jellies, a minimum pH value of 4.20 and a maximum pH value ranging from 4.50 to 5.30. In the case of pectinylic acids requiring for solution of their calcium jellies, pH values ranging from 1.6 to 1.0, a minimum pH value must be maintained in the kettle of 5.80, and a maximum pH value ranging from 6.00 to 7.00.

Tricalcium phosphate is itself a buffer salt, so that there may be times when quantities of an acid, such as citric or tartaric acid, must be added to the mixture treated in the kettle to reach the pH desired.

The pectinylic acids prepared according to the present invention are characterized by a jelly grade much higher than that of the pectase treated pectins shown in the recent article by Hills, White and Baker, entitled "Low-sugar jellying pectinates." The latter authors use one gram of pectin, 54 grams of sugar and 100 grams of water to prepare 155 grams of a calcium jelly containing about 35% sugar which is not up to the desired strength (below 50 cm. of water). If the amounts given in this formula are multiplied by three, it will be seen that three grams of pectin yield 465 grams of substandard jelly. Three grams of pectinylic acid of the present invention, on the other hand, in combination with 100 grams sugar, 480 cc. of water and 2.5 grams sodium citrate will yield 585 grams of a standard calcium jelly containing about 17% sugar. In other words, our pectinylic acid, at half the sugar concentration used by Hills, White and Baker, will form 585.5 grams jelly rather than the 465 grams jelly obtained from the pectase treated pectin of Hills, White and Baker, binding 480 cc. of water rather than 300 cc. of water bound by the pectase treated pectin shown by Hills, White and Baker.

In general, the gel forming properties of our pectinylic acid may be utilized for a great variety of purposes, such as preparing jellies with fruit juices; preparation of confections of high sugar concentrations (70 to 75% sugar solids); for the preparation of jellies of low sugar content (0 to 40%); for making milk custards; and for stabilizing sherbets and ice creams.

It will thus be seen that the pectinylic acids containing less than 2.8% ash prepared by the methods disclosed in this application are new compounds, although calcium salts of these pectinylic acids may have been prepared heretofore. Further, we have provided a method for preparing these pectinylic acids in a form adapting the same for commercial use. More particularly, we have provided methods for preparing pectinylic acids in water soluble form and having any desired gel forming and other properties adapting the pectinylic acids for use in food products. We have, specifically, provided methods for preparing novel high sugar jellies from pectinylic acids, in which jelly formation is due principally to the dehydrating effect of sugar at the prevailing pH values.

Many details of procedure and composition may be varied within a wide range without departing from the principles of this invention and it is therefore not our purpose to limit the patent granted on this invention otherwise than necessitated by the scope of the appended claims.

We claim as follows:

1. The method of preparing a pectous jelly which comprises reacting an aqueous pectin material with pectase at a pH maintained between about 5.5 and 6.5 and at a temperature below 160° F. to produce a pectinylic acid, terminating said pectase reaction when a calcium jelly of the pectinylic acid so produced requires a pH less than 6.0 but not less than 2.4 to dissolve the same, recovering from the reaction mass after such termination a pectase-free pectinylic acid having a pH of set of not less than 2.30 at room temperature and containing not more than 2.8% ash and water soluble to the extent that one gram thereof is capable of being dissolved in 100 cc. of distilled water at 130° F., dissolving the resulting pectinylic acid in an aqueous solution containing at least 40% sugar, said dissolution being carried out at an elevated temperature in excess of the temperature of set of said pectinylic acid, regulating the pH of the resulting solution so as not to exceed 4.5 but so as to exceed the pH of set of said pectinylic acid at said elevated temperature and at the sugar concentration of said solution, and cooling said solution at least to the temperature of set of said pectinylic acid.

2. The method of preparing a pectous jelly which comprises reacting an aqueous pectin material with pectase at a pH maintained between about 5.5 and 6.5 and at a temperature below 160° F. to produce a pectinylic acid, terminating said pectase reaction when a calcium jelly of the pectinylic acid so produced requires a pH less than 6.0 but not less than 2.4 to dissolve the same, recovering from the reaction mass after such termination a pectase-free pectinylic acid having a pH of set of not less than 2.30 at room temperature and containing not more than 2.8% ash and water soluble to the extent that one gram thereof is capable of being dissolved in 100 cc. of distilled water at 130° F., dissolving the resulting pectinylic acid in water containing at least 40% but not over 65% sugar, said dissolution being carried out at an elevated temperature in excess of the temperature of set of said pectinylic acid, regulating the pH of the resulting solution so as not to exceed 4.5 but so as to exceed the pH of set of said pectinylic acid at said elevated temperature and at the sugar concentration of said solution and cooling said solution at least to the temperature of set of said pectinylic acid.

3. The method of preparing a pectous jelly which comprises reacting an aqueous pectin material with pectase at a pH maintained between about 5.5 and 6.5 and at a temperature below 160° F. to produce a pectinylic acid, terminating said pectase reaction when a calcium jelly of the pectinylic acid so produced requires a pH between 2.4 and 6.0 to dissolve the same, recovering from the reaction mass after such termination a pectase-free pectinylic acid having a pH of set of not less than 2.30 at room temperature and containing not more than 2.8% ash and water soluble to the extent that one gram thereof is capable of being dissolved in 100 cc. of distilled water at 130° F., dissolving the resulting pectinylic acid in an aqueous solution containing not more than 10 parts of calcium per million and from 65% to 75% sugar, said dissolution being carried out at an elevated temperature in excess of the temperature of set of said pectinylic acid, regulating the pH value of the resulting solution so as not to exceed 4.5, thereafter lowering the pH of said solution to make gel formation of said solution possible at a higher temperature than at the original pH value of said solution and cooling said solution at least to the temperature of set of said pectinylic acid at said lowered pH value.

4. The method of preparing a pectous jelly which comprises reacting an aqueous pectin material with pectase at a pH maintained between 5.5 and 6.5 and at a temperature below 160° F. to produce a pectinylic acid, terminating said pectase reaction when a calcium jelly of the pectinylic acid so produced requires a pH between 2.4 and 6.0 to dissolve the same, recovering from the reaction mass after such termination a pectase-free pectinylic acid having a pH of set of not less than 2.30 at room temperature and containing not more than 2.8% ash and water soluble to the extent that one gram thereof is capable of being dissolved in 100 cc. of distilled water at 130° F., dissolving the resulting pectinylic acid in water containing not more than 10 parts calcium per million, an amount of sugar forming with said water more than a 65% solution, and a substantial amount of a soluble edible salt capable of precipitating calcium, said dissolution being carried out at an elevated temperature in excess of the temperature of set of said pectinylic acid and regulating the pH of the resulting solution so as not to exceed 4.5 but so as to exceed the pH of set of said pectinylic acid at said elevated temperature and at the sugar concentration of said solution and cooling the resulting solution at least to the temperature of set of said pectinylic acid.

5. A pectase-free aqueous pectous jelly containing from 40% to 75% sugar, a substantial amount of an edible salt capable of precipitating calcium, and a substantial amount of a pectinylic acid containing not more than 2.8% ash and water soluble to the extent that one gram thereof is capable of being dissolved in 100 cc. of water at 130° F., said pectinylic acid having been produced by reacting an aqueous pectin material with pectase at a pH maintained between 5.5 and 6.5 and at a temperature below 160° F. to produce a pectinylic acid, terminating said pectase reaction when a calcium jelly of the pectinylic acid so produced requires a pH of between 2.4 and 6.0 to dissolve the same, and recovering from the reaction mass after such termination a pectase-free pectinylic acid having a pH of set of not less than 2.30 at room temperature.

6. A dry pectase-free composition capable in the absence of calcium ions of forming jellies with aqueous sugar solutions containing more than 40% sugar comprising an effective amount of a soluble edible salt capable of precipitating calcium and a pectase-free pectinylic acid containing not more than 2.8% ash and water soluble to the extent that one gram thereof is capable of being dissolved in 100 cc. of water at 130° F., said pectinylic acid having been produced by reacting an aqueous pectin material with pectase at a pH maintained between 5.5 and 6.5 and at a temperature below 160° F. to produce a pectinylic acid, terminating said pectase reaction when a calcium jelly of the pectinylic acid so produced requires a pH of between 2.4 and 6.0 to dissolve the same, and recovering from the reaction mass after such termination a pectase-free pectinylic acid having a pH of set of not less than 2.30 at room temperature.

7. A dry pectase-free composition capable in the absence of calcium ions of forming candy jellies with aqueous sugar solutions containing more than 65% of combined sugar and glucose, said composition comprising an effective amount of sodium citrate and a pectase-free pectinylic acid containing not more than 2.8% ash and water soluble to the extent that one gram thereof is capable of being dissolved in 100 cc. of water at 130° F., said pectinylic acid having been produced by reacting an aqueous pectin material with pectase at a pH maintained between 5.5 and 6.5 and at a temperature below 160° F. to produce a pectinylic acid, terminating said pectase reaction when a calcium jelly of the pectinylic acid so produced requires a pH of between 2.4 and 6.0 to dissolve the same, and recovering from the reaction mass after such termination a pectase-free pectinylic acid having a pH of set of not less than 2.30 at room temperature.

HERBERT T. LEO.
CLARENCE C. TAYLOR.

REFERENCES CITED

The following references are of record in the file of this patent:

UNITED STATES PATENTS

| Number | Name | Date |
|---|---|---|
| 1,513,615 | Leo | Oct. 28, 1924 |
| 1,991,242 | Cole et al. | Feb. 12, 1935 |
| 2,115,479 | Beach | Apr. 26, 1938 |
| 2,133,273 | Cox | Oct. 18, 1938 |
| 2,233,574 | Baker et al. | Mar. 4, 1941 |
| 2,273,527 | Joseph | Feb. 17, 1942 |
| 2,334,281 | Olsen et al. | Nov. 16, 1943 |
| 2,358,430 | Willaman et al | Sep. 19, 1944 |
| 2,369,846 | Olsen | Feb. 20, 1945 |
| 2,406,840 | Leo et al. | Sep. 3, 1946 |

OTHER REFERENCES

Proceed. of Food Tech., 1942 pages 47 to 58 by Hills et al.